United States Patent
Shin et al.

(10) Patent No.: US 10,658,128 B2
(45) Date of Patent: May 19, 2020

(54) ELECTRIC DOUBLE-LAYER DEVICE

(71) Applicant: Nesscap Co., Ltd., Yongin-si, Gyeonggi-do (KR)

(72) Inventors: Na Ri Shin, Hwasung-si (KR); Sung Wook Yoo, Yongin-si (KR); Kyu Jeung Lee, Seoul (KR); Young Jin Kim, Yongin-si (KR); Hyung Sik Ahn, Suwon-si (KR); Jung Ho Choi, Yongin-si (KR); Young Seg Choi, Ansan-si (KR)

(73) Assignee: Nesscap Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/564,189

(22) PCT Filed: Mar. 10, 2016

(86) PCT No.: PCT/KR2016/002405
§ 371 (c)(1),
(2) Date: Mar. 16, 2018

(87) PCT Pub. No.: WO2016/163647
PCT Pub. Date: Oct. 13, 2016

(65) Prior Publication Data
US 2018/0182563 A1 Jun. 28, 2018

(30) Foreign Application Priority Data

Apr. 9, 2015 (KR) .................. 10-2015-0050072
Feb. 25, 2016 (KR) .................. 10-2016-0022392

(51) Int. Cl.
*H01G 11/74* (2013.01)
*H01G 11/78* (2013.01)
(Continued)

(52) U.S. Cl.
CPC ............. *H01G 11/82* (2013.01); *H01G 11/74* (2013.01); *H01G 11/78* (2013.01); *H01G 11/80* (2013.01); *Y02E 60/13* (2013.01); *Y02T 10/7022* (2013.01)

(58) Field of Classification Search
CPC .......... H01G 11/74; H01G 1/82; H01G 11/84; H01G 11/06; H01G 11/78; H01G 11/80; H01G 11/82
(Continued)

(56) References Cited

U.S. PATENT DOCUMENTS

| 6,366,447 | B1 | 4/2002 | Nakaaki |
| 2007/0188978 | A1 | 8/2007 | Kang et al. |

(Continued)

FOREIGN PATENT DOCUMENTS

| EP | 2 490 234 A1 | 8/2012 |
| EP | 2682967 A1 | 1/2014 |

(Continued)

OTHER PUBLICATIONS

Extended European Search Report dated Dec. 12, 2018 in corresponding European Application No. 16776750.8.
(Continued)

*Primary Examiner* — Arun Ramaswamy
(74) *Attorney, Agent, or Firm* — Knobbe Martens Olson & Bear LLP

(57) ABSTRACT

Disclosed herein is an electric double layer device including a urethane potting unit (50) for filling the gap between a portion of a first terminal (21) that is exposed out of a rubber cap (40) and a first through hole (41) and the gap between a portion of a second terminal (22) that is exposed out of the rubber cap and a second through hole (42), wherein an aluminum terminal (A) constituting each of the first terminal (21) and the second terminal (22) is anodized such that an
(Continued)

aluminum oxide film (Al) is formed on the aluminum terminal, whereby the lifespan of the electric double layer device is relatively increased.

18 Claims, 10 Drawing Sheets

(51) Int. Cl.
   *H01G 11/80* (2013.01)
   *H01G 11/82* (2013.01)

(58) Field of Classification Search
   USPC .............. 361/502, 503, 511, 517, 518, 519
   See application file for complete search history.

(56) References Cited

U.S. PATENT DOCUMENTS

| | | | |
|---|---|---|---|
| 2011/0253436 A1* | 10/2011 | Hasegawa | H01G 11/74 174/259 |
| 2012/0244409 A1* | 9/2012 | Ok | H01M 2/0222 429/130 |
| 2013/0059064 A1 | 3/2013 | Majima et al. | |
| 2014/0085775 A1 | 3/2014 | Nakasima et al. | |
| 2014/0377667 A1* | 12/2014 | Roschenthaler | C07C 309/10 429/331 |

FOREIGN PATENT DOCUMENTS

| | | |
|---|---|---|
| JP | S51-128242 U | 10/1976 |
| JP | S53-1637 U | 1/1978 |
| JP | S54-86647 U | 6/1979 |
| JP | H01-270214 A | 10/1989 |
| JP | H01-304169 A | 12/1989 |
| JP | H6-132172 | 5/1994 |
| JP | 2005-142416 A | 6/2005 |
| JP | 2006-222256 A | 8/2006 |
| JP | 3960829 B2 | 8/2007 |
| JP | 2009-164360 A | 7/2009 |
| JP | 2010-161277 A | 7/2010 |
| KR | 10-2001-0032556 A | 4/2001 |
| KR | 10-2003-0014806 A1 | 2/2003 |
| KR | 10-2003-0025038 A | 3/2003 |
| KR | 10-2007-0081915 A1 | 8/2007 |
| KR | 10-2009-0118328 A | 11/2009 |
| KR | 10-2012-0086696 A | 8/2012 |
| KR | 10-2014-0143641 A | 12/2014 |
| WO | WO 2012/117820 A1 | 9/2012 |

OTHER PUBLICATIONS

Office Action dated Jan. 19, 2018 in related Korean Application No. 10-2017-0139043.
International Search Report (including English translation) and Written Opinion dated May 31, 2016 in International Application No. PCT/KR2016/002405, filed Mar. 10, 2016, in 8 pages.
Final Office Action dated Sep. 11, 2018 in related Korean Application No. 10-2017-0139043.
Office Action dated Jan. 21, 2020 in Japanese Application No. 2017-552838, in 8 pages (incl. translation).

* cited by examiner

ELECTRIC DOUBLE-LAYER DEVICE

TECHNICAL FIELD

The present invention relates to an electric double layer device, and more particularly to an electric double layer device that has a long lifespan and a neat external appearance.

BACKGROUND ART

In general, an electric double layer device is a device that stores electrical energy, such as a battery, a capacitor, or an electrolytic condenser. An electric double layer device is electrically charged and discharged using electrodes that are electrically conductive. Electric double layer devices are used in cellular phones, GPS receivers, MP3 players, and backup memory devices. In addition, electric double layer devices are used in wind energy systems, solar energy systems, and motors of electric vehicles and hybrid electric vehicles.

One example of such an electric double layer device may be a capacitor.

In the electric double layer capacitor, an electrostatic layer is formed at the interface between an activated carbon electrode and an organic electrolyte, and the state of an electric double layer functions as a dielectric in order to accumulate electricity in the same manner as a battery.

In particular, charges that accumulate in an electric double layer, formed between a solid electrode and a solid-state or liquid-state electrolyte, are used.

A capacitor has lower energy density than a battery. However, the capacitor is superior to the battery in terms of power density, that is, instantaneous high output. In addition, the capacitor is usable hundreds of thousands of times. That is, the lifespan of the capacitor is semi-permanent. For these reasons, capacitors are used in various fields.

The electric double layer capacitor is operated according to the following principle. When direct current voltage is applied to a pair of solid electrodes in the state in which the solid electrodes are placed in an electrolyte ion solution, negative ions are electrostatically drawn to an electrode acting as a positive electrode, and positive ions are electrostatically drawn to an electrode acting as a negative electrode. As a result, an electric double layer is formed at the interface between each electrode and the electrolyte. In particular, activated carbon has a plurality of pores. For this reason, the electric double layer is easily formed.

The electric double layer capacitor includes electrodes, a separator, an electrolyte, current collectors, and a case.

The selection of materials for the electrodes is most important when configuring the capacitor. However, the capacitance of the capacitor is also changed by various other components of the capacitor.

The materials for the electrodes must have high electrical conductivity and a large specific surface area. In addition, the materials for the electrodes must be electrochemically stable.

Another example of such an electric double layer device may be a battery.

The battery is a device that converts chemical energy, stored in a chemical material (i.e. an active material) contained therein, into electrical energy through an electrochemical oxidation-reduction reaction (a redox reaction).

The battery is constituted by assembling two or more electrochemical cells. Alternatively, the battery may be constituted by a single cell. The battery is configured such that electrons flow to the outside along a conductive wire due to an electrochemical reaction, rather than a chemical reaction. The electrons that flow along the conductive wire become a source of electrical energy, thereby being electrically useful.

More specifically, the battery has a positive electrode (cathode) active material and a negative electrode (anode) active material coated on respective current collectors. The positive electrode and the negative electrode are separated from each other by a separator. In addition, the positive electrode and the negative electrode are placed in an electrolyte, which enables the transfer of ions between the two electrodes.

In order to operate an electric lamp, an apparatus, an instrument, etc., the electrode materials and the electrolyte must be selected appropriately and arranged so as to have a specific structure such that sufficient voltage and current are generated between the two electrodes of the battery.

For example, a positive electrode, the positive electrode active material of which is reduced by electrons received from an external conductive wire, a negative electrode, the negative electrode active material of which is oxidized so as to emit electrons to the conductive wire, an electrolyte, which enables material to move such that the reduction reaction of the positive electrode and the oxidation reaction of the negative electrode are chemically harmonious, and a separator, which prevents physical contact between the positive electrode and the negative electrode, must be arranged so as to convert chemical energy into electrical energy based on interactions therebetween.

The negative electrode of the battery, arranged as described above, basically emits electrons while being oxidized, and the positive electrode receives electrons while being reduced (together with positive ions). When the battery is operated in the state of being connected to an external load, therefore, the two electrodes are electrochemically changed to thus perform electrical work.

At this time, the electrons, which are generated by the oxidation reaction of the negative electrode, move to the positive electrode via the external load, and then undergo a reduction reaction with the positive electrode active material. Consequently, the flow of charges is completed as the result of movement of negative ions (anions) and positive ions (cations) toward the negative electrode and the positive electrode in the electrolyte.

In this way, the reaction is performed in the electrolyte such that charges continuously flow in the external conductive wire, and the electrical operation is performed using the charges.

Based on the kind of electrolyte, the battery may be classified as a liquid electrolyte battery or a polymer electrolyte battery. In general, the liquid electrolyte battery is referred to as a lithium ion battery, and the polymer electrolyte battery is referred to as a lithium polymer battery.

FIG. 1 is a schematic view showing the structure of a general electric double layer device, FIG. 2 is a schematic view illustrating the principle whereby an electric double layer capacitor manufactured using a general electric double layer device is charged, and FIG. 3 is a circuit diagram illustrating the principle whereby the electric double layer capacitor manufactured using the general electric double layer device is charged and discharged.

As shown in FIG. 1, the general electric double layer device, denoted by reference numeral 100, includes electrodes 10, an electrolyte 20, current collectors 30, a separator 40, a first lead terminal 61, and a second lead terminal 62.

On the assumption that the electric double layer device 100 is a battery, the chemical energy of a chemical material (i.e. an active material) contained therein is converted into electrical energy through an electrochemical oxidation-reduction reaction, and the electrodes 10 have a positive electrode active material and a negative electrode active material, which are coated on the respective current collectors 30.

Describing the characteristics of the electric double layer device 100 in more detail based on the assumption that the electric double layer device 100 is a capacitor, on the other hand, energy is stored using the distribution of positive and negative charges which are arranged within a short distance from each other at the interface between the two different electrodes 10, the capacitance, in farads, is high, and the change and deterioration in performance upon repeated charge and discharge cycles thereof are very low.

The electrodes 10 are made of activated carbon, which has a large specific surface area, and store charges generated at the electric double layer, which is disposed at the interface with the electrolyte 20. Of the electrical characteristics of the electrodes 10, capacitance and internal resistance are the most important criteria for evaluating the performance thereof. Consequently, the electrodes 10 must exhibit low specific resistance and have a porous structure. In the porous structure, the size and distribution of pores must be simple and biased within a predetermined range. The material characteristics of the electrodes 10 most strongly affect the inherent charge and discharge characteristics of the electric double layer capacitor.

In recent years, therefore, an activated carbon-based material, which has a large specific surface area and is inexpensive, has been mainly used as the material for the electrodes 10, and research into the use of metal oxides and conductive polymers in order to increase energy density has been increasingly conducted.

Meanwhile, an organic solvent, quaternary ammonium salt (organic), or a sulfuric acid solution (aqueous) is used as the electrolyte 20. For the organic solvent electrolyte, polycarbonate (PC) and ethyl methyl carbonate (EMC) or PC and dimethoxyethane (DME) may be mixed at a predetermined ratio in order to improve electrical conductivity.

An electric double layer capacitor 100 using an organic electrolyte has a capacitance per unit area of 4 to 6 $\mu F/cm^2$. The electrical conductivity of the organic electrolyte is higher than that of the aqueous electrolyte. Consequently, an electric double layer capacitor 100 using an aqueous electrolyte has a capacitance per unit area of 5 to 10 $\mu F/cm^2$, which is higher than that of the electric double layer capacitor 100 using the organic electrolyte. However, the electric double layer capacitor 100 using the aqueous electrolyte has problems in that the potential window is narrow and decomposition occurs.

Nonwoven fabric, porous polyethylene (PE), or porous polypropylene (PP) film is used as the separator 40.

The principle whereby the electric double layer capacitor is charged is as follows. As shown in FIG. 1, the two electrodes 10, which are placed in the electrolyte 20, are disposed so as to be opposite each other in the state in which the separator 40 is located therebetween. In the state in which electrical energy is not supplied from the outside, as shown in FIG. 2, which is a schematic view illustrating the principle whereby the electric double layer capacitor is charged, the electric double layer capacitor is in a bulk state, in which charges are non-uniformly distributed. As a result, the potential difference between the electrodes 10 becomes 0. When electrical energy is supplied from the outside, as shown in FIG. 3, which is a circuit diagram illustrating the principle whereby the electric double layer capacitor is charged and discharged, charges are uniformly distributed throughout the electric double layer capacitor. As a result, as shown in FIG. 2, energy having a voltage corresponding to a potential difference of $2\Phi_1$ is charged between the two electrodes 10.

At this time, even when the supply of electrical energy is interrupted, the electric double layer, which has already been formed, is not extinguished, and therefore the charged electrical energy is retained.

Related Art Document (Korean Patent Application Publication No. 2009-0118328 Entitled Module Type Electric Double Layer Capacitor and Method of Manufacturing the Same)

FIG. 4 is a view showing a process of manufacturing an electric double layer capacitor according to the Related Art Document, FIG. 5 is a view illustrating a method of manufacturing an integrated electric double layer capacitor according to the Related Art Document, and FIG. 6 is a view illustrating a process of manufacturing an electrode device that constitutes the electric double layer capacitor according to the Related Art Document.

In general, a secondary battery that can be charged and discharged, for example, an energy storage apparatus, such as an electrolytic condenser or an electrochemical double layer capacitor (EDLC), is configured to have a wound type structure, e.g. a jelly-roll type structure.

As shown in FIG. 4, a wound type energy storage apparatus, such as a wound type electrochemical double layer capacitor, generally includes a cylindrical case 20 made of aluminum (Al) and a wound device 10 mounted in the case 20.

The wound device 10 is formed by winding a strip-shaped electrode stack, that is, positive and negative electrode devices with an electrolyte interposed between the positive and negative electrode devices, into a cylindrical shape and then taping the outside of the strip-shaped electrode stack in order to prevent the strip-shaped electrode stack from being unwound.

The wound device 10 formed as described above is impregnated with an electrolyte and is then mounted in the cylindrical case 20. A terminal plate 30 is disposed above the wound device 10, and lug type or screw type external terminals 40 are fastened to the terminal plate 30.

In addition, a neck 21, which prevents the terminal plate 30 from being pushed downward, is formed in the upper part of the case 20 in a recessed state. The wound device 10 is mounted in the case 20 after the neck 21 is formed in the case 20. The wound device 10 is electrically connected to the external terminals 40 via terminals 120. Subsequently, the upper end 22 of the case 20 is curled. As a result, the terminal plate 30 is fixed in the case 20, and the assembly process is completed.

Referring to the upper figure of FIG. 6, an electrode device 100 includes an electrode current collection sheet 111 made of general aluminum foil and an electrode active material 112 coated on the electrode current collection sheet 111.

The electrode active material 112 is formed by applying conductive paste including mostly activated carbon.

A terminal 120 is coupled to the electrode device 100. Specifically, a portion of the electrode device 100 to which the terminal 120 will be coupled is scratched to remove the electrode active material 112 therefrom, the scratched portion of the electrode device 100 is drilled, and the terminal 120 is coupled to the drilled portion of the electrode device 100 by riveting.

The applicant of the present application has improved the electric double layer device according to the Related Art Document, and therefore proposes an electric double layer device according to the present invention.

DISCLOSURE

Technical Problem

It is an object of the present invention to provide an electric double layer device configured to completely prevent the leakage of positive ions, whereby the positive ions are prevented from being wetted and thus the lifespan of the electric double layer device is relatively increased.

It is another object of the present invention to provide an electric double layer device having a neat external appearance while improving workability.

It is another object of the present invention to provide an electric double layer device configured to prevent the corrosion of an aluminum terminal.

It is another object of the present invention to provide an electric double layer device configured such that a volume protrusion, which protrudes upward, of a rubber cap has a concave portion, the height of which gradually decreases toward the center thereof in such a manner that the concave portion becomes flat even though the center of the volume protrusion rises when a case is beaded, whereby a first terminal and a second terminal are stably loaded on a circuit board when the first terminal and the second terminal are connected to the circuit board.

It is another object of the present invention to provide an electric double layer device configured to increase surface coupling force between each of a first pot recess and a second pot recess and a urethane resin.

It is a further object of the present invention to provide an electric double layer device configured to maximally increase adherence between each of a first pot recess and a second pot recess and a urethane resin.

Technical Solution

In accordance with the present invention, the above and other objects can be accomplished by the provision of an electric double layer device including: a wound electrode unit having a first current collection sheet and a second current collection sheet wound in the state in which the first current collection sheet and the second current collection sheet are separated from each other by a separating sheet; a first terminal and a second terminal connected to the first current collection sheet and the second current collection sheet, respectively; a case for receiving the wound electrode unit; and a rubber cap for covering the case, the rubber cap having therein a first through hole and a second through hole, through which the first terminal and the second terminal extend respectively so as to be exposed to the outside, wherein the electric double layer device further includes a urethane potting unit for filling the gap between a portion of the first terminal that is exposed out of the rubber cap and the first through hole and the gap between a portion of the second terminal that is exposed out of the rubber cap and the second through hole, and the urethane potting unit includes:

a first pot recess and a second pot recess defined by a volume protrusion, which protrudes upward, of the rubber cap so as to be disposed around the first through hole and the second through hole, through which the first terminal and the second terminal extend, respectively, such that the first pot recess and the second pot recess are lower in position than the volume protrusion; and a urethane resin filling and hardened in the first pot recess and the second pot recess.

Advantageous Effects

According to the present invention, an electric double layer device further includes a urethane potting unit for filling the gap between a first terminal and a first through hole and the gap between a second terminal and a second through hole. Consequently, it is possible to completely prevent the leakage of positive ions, whereby the positive ions are prevented from being wetted and thus the lifespan of the electric double layer device is relatively increased.

According to the present invention, a urethane resin is rapidly and easily introduced into a first pot recess and a second pot recess defined by a volume protrusion, which protrudes upward, of a rubber cap such that the first pot recess and the second pot recess are lower in position than the volume protrusion. Consequently, it is possible to maximally prevent a phenomenon in which the urethane resin spreads out after being introduced into the first pot recess and the second pot recess while improving workability, whereby the electric double layer device has a neat external appearance.

According to the present invention, when the urethane resin is introduced into the first pot recess and the second pot recess, the urethane resin rapidly fills a first pocket and a second pocket and is hardened in tight contact with the first terminal and the second terminal, respectively. As a result, it is possible to further completely prevent the leakage of positive ions through the gap between the first terminal and the first through hole and the gap between the second terminal and the second through hole, whereby the lifespan of the electric double layer device is further increased.

According to the present invention, an aluminum terminal is anodized in advance to form an aluminum oxide film thereon, whereby the lifespan of the electric double layer device is guaranteed.

According to the present invention, the volume protrusion, which protrudes upward, of the rubber cap has a concave portion, the height of which gradually decreases toward the center thereof such that the concave portion becomes flat even though the center of the volume protrusion rises when the case is beaded, whereby the first terminal and the second terminal are stably loaded on a circuit board when the first terminal and the second terminal are connected to the circuit board.

According to the present invention, it is possible to increase surface coupling force between each of the first pot recess and the second pot recess and the urethane resin.

According to the present invention, it is possible to maximally increase adherence between each of the first pot recess and the second pot recess and the urethane resin.

DESCRIPTION OF DRAWINGS

The above and other objects, features and other advantages of the present invention will be more clearly understood from the following detailed description taken in conjunction with the accompanying drawings, in which.

BEST MODE

Figure 1:
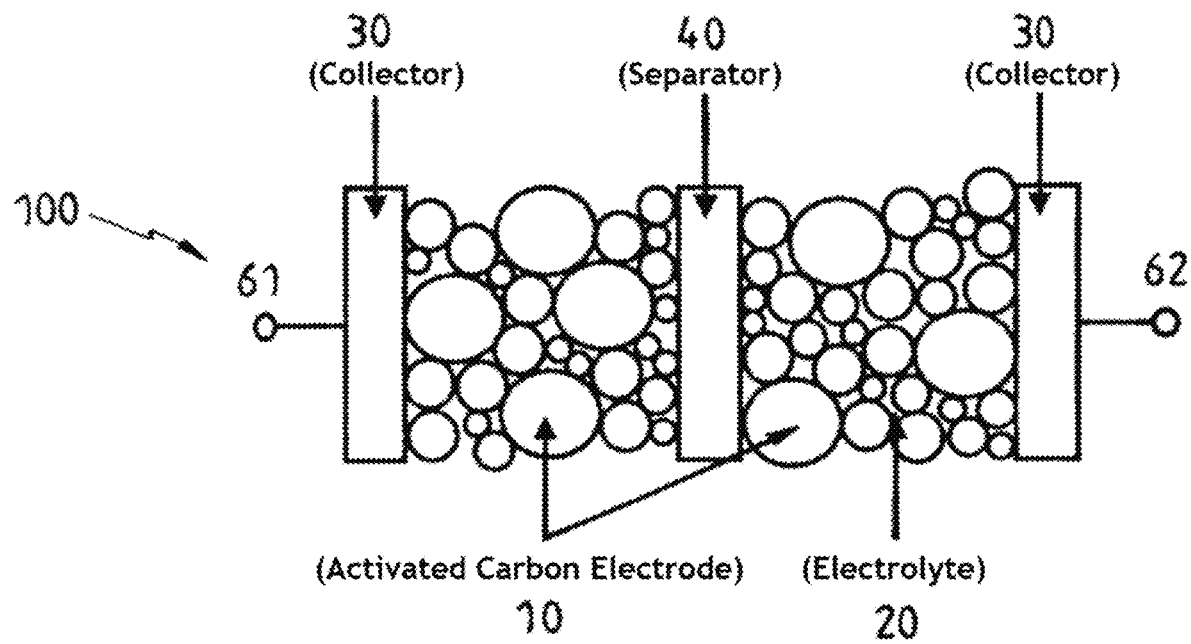
FIG. 1 is a schematic view showing the structure of a general electric double layer device.
Figure 2:
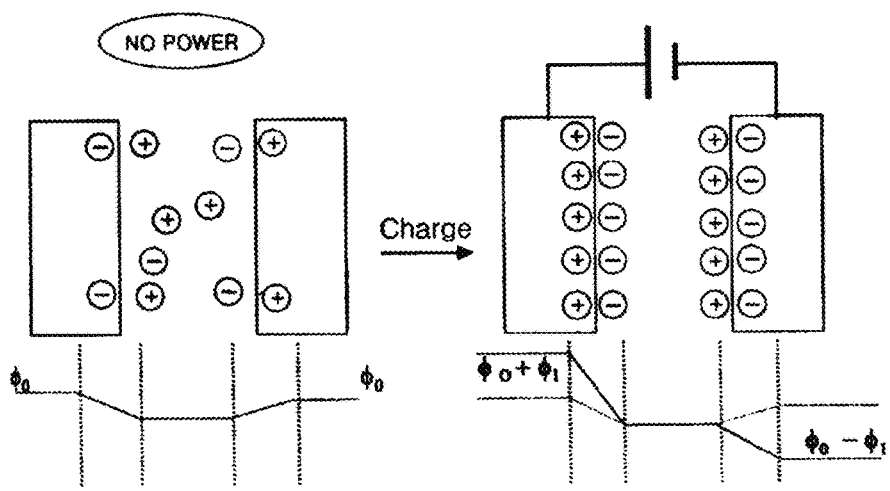
FIG. 2 is a schematic view illustrating the principle whereby an electric double layer capacitor manufactured using a general electric double layer device is charged.
Figure 3:
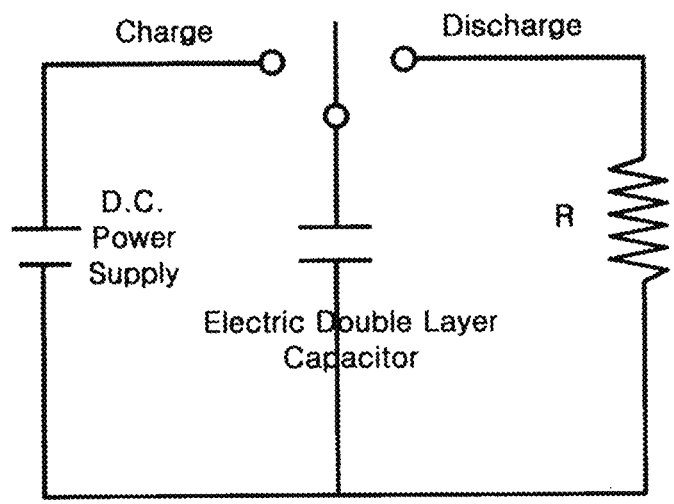
FIG. 3 is a circuit diagram illustrating the principle whereby the electric double layer capacitor manufactured using the general electric double layer device is charged and discharged.
Figure 4:
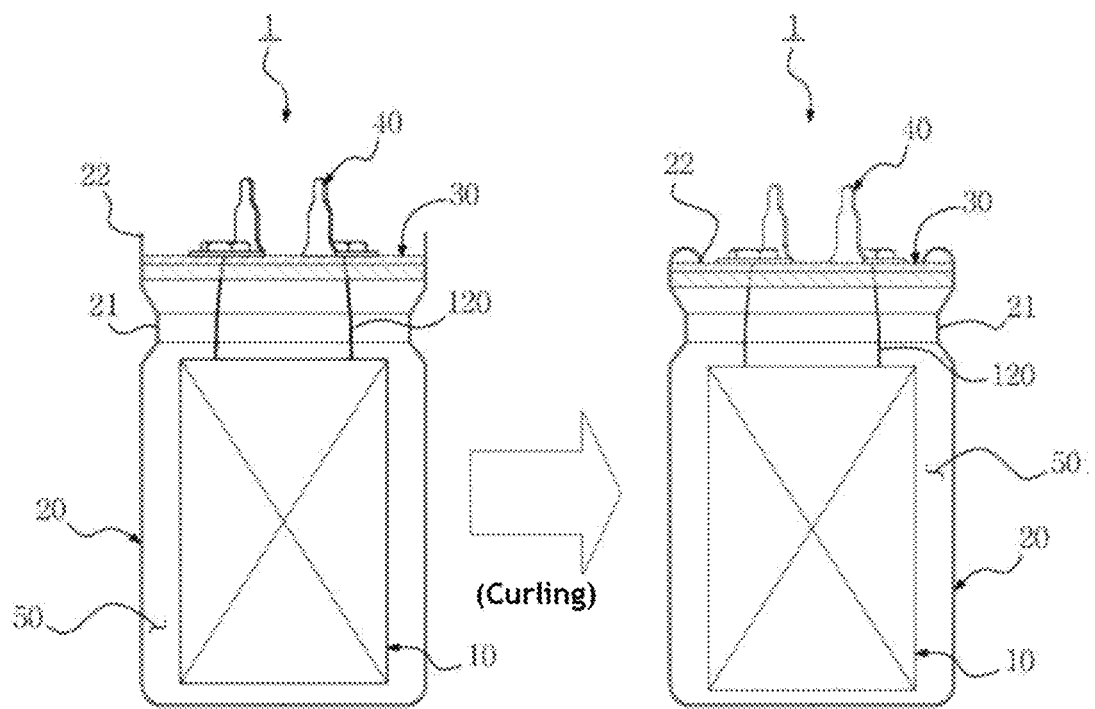
FIG. 4 is a view showing a process of manufacturing an electric double layer capacitor according to a Related Art Document.
Figure 5:
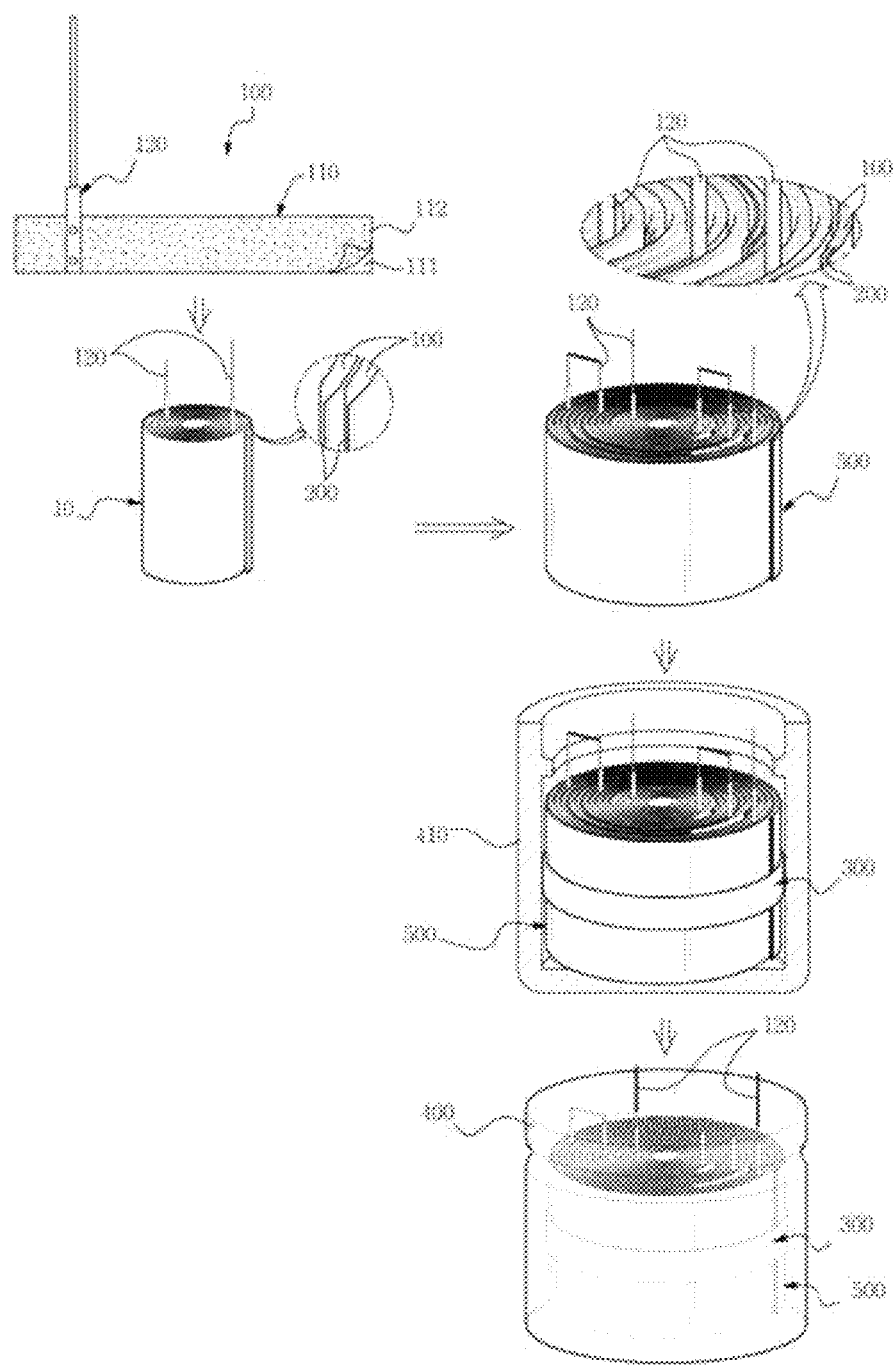
FIG. 5 is a view illustrating a method of manufacturing an integrated electric double layer capacitor according to the Related Art Document.
Figure 6:
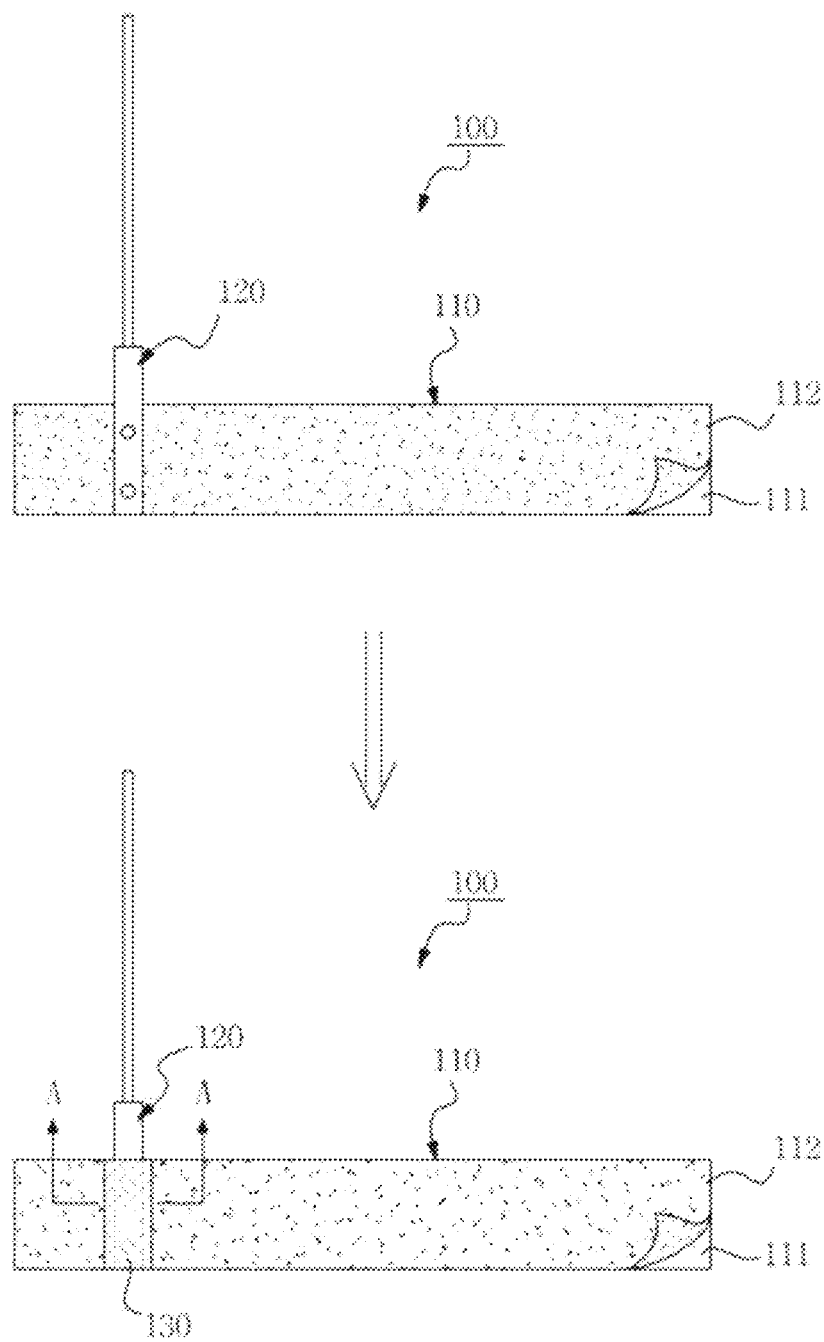
FIG. 6 is a view illustrating a process of manufacturing an electrode device that constitutes the electric double layer capacitor according to the Related Art Document.

In the best mode for carrying out the present invention, an electric double layer device includes: a wound electrode unit (10) having a first current collection sheet (11) and a second current collection sheet (12) wound in the state in which the first current collection sheet and the second current collection sheet are separated from each other by a separating sheet (13); a first terminal (21) and a second terminal (22) connected to the first current collection sheet (11) and the second current collection sheet (12), respectively; a case (30) for receiving the wound electrode unit (10); and a rubber cap (40) for covering the case (30), the rubber cap having therein a first through hole (41) and a second through hole (42), through which the first terminal (21) and the second terminal (22) extend respectively so as to be exposed to the outside, wherein the electric double layer device further includes a urethane potting unit (50) for filling the gap between a portion of the first terminal (21) that is exposed out of the rubber cap (40) and the first through hole (41) and the gap between a portion of the second terminal (22) that is exposed out of the rubber cap (40) and the second through hole (42), and the urethane potting unit (50) includes: a first pot recess (51) and a second pot recess (52) defined by a volume protrusion (43), which protrudes upward, of the rubber cap (40) so as to be disposed around the first through hole (41) and the second through hole (42), through which the first terminal (21) and the second terminal (22) extend, respectively, such that the first pot recess and the second pot recess are lower in position than the volume protrusion; and a urethane resin (53) filling and hardened in the first pot recess (51) and the second pot recess (52). Since the electric double layer device further includes the urethane potting unit (50) for filling the gap between the first terminal (21) and the first through hole (41) and the gap between the second terminal (22) and the second through hole (42), it is possible to completely prevent the leakage of positive ions, whereby the positive ions are prevented from being wetted and thus the lifespan of the electric double layer device is relatively increased.

Mode for Invention

An exemplary embodiment of an electric double layer device according to the present invention will be described in detail with reference to the accompanying drawings. A plurality of embodiments may be provided. The objects, features, and advantages of the present invention will be more clearly understood from the following detailed description of the embodiment.

Figure 7:
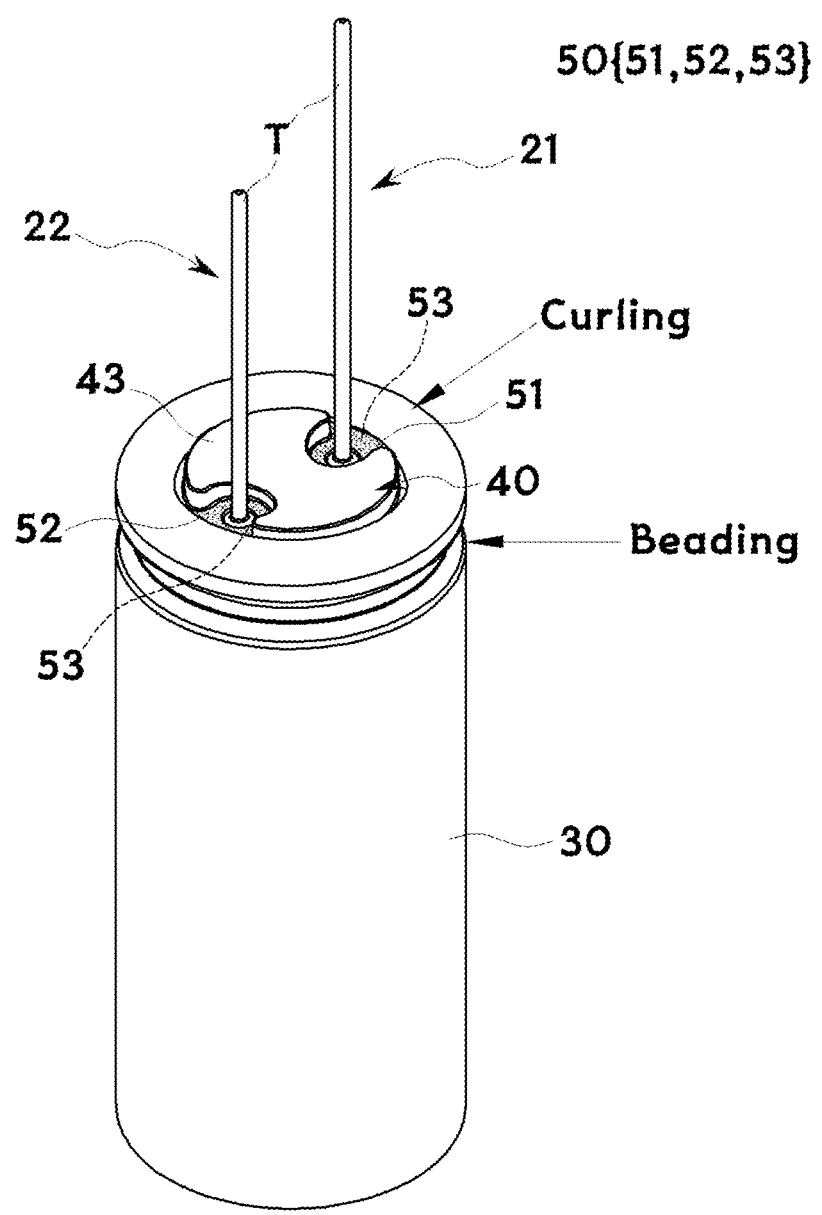
FIG. 7 is a perspective view showing an electric double layer device according to the present invention.
Figure 8:
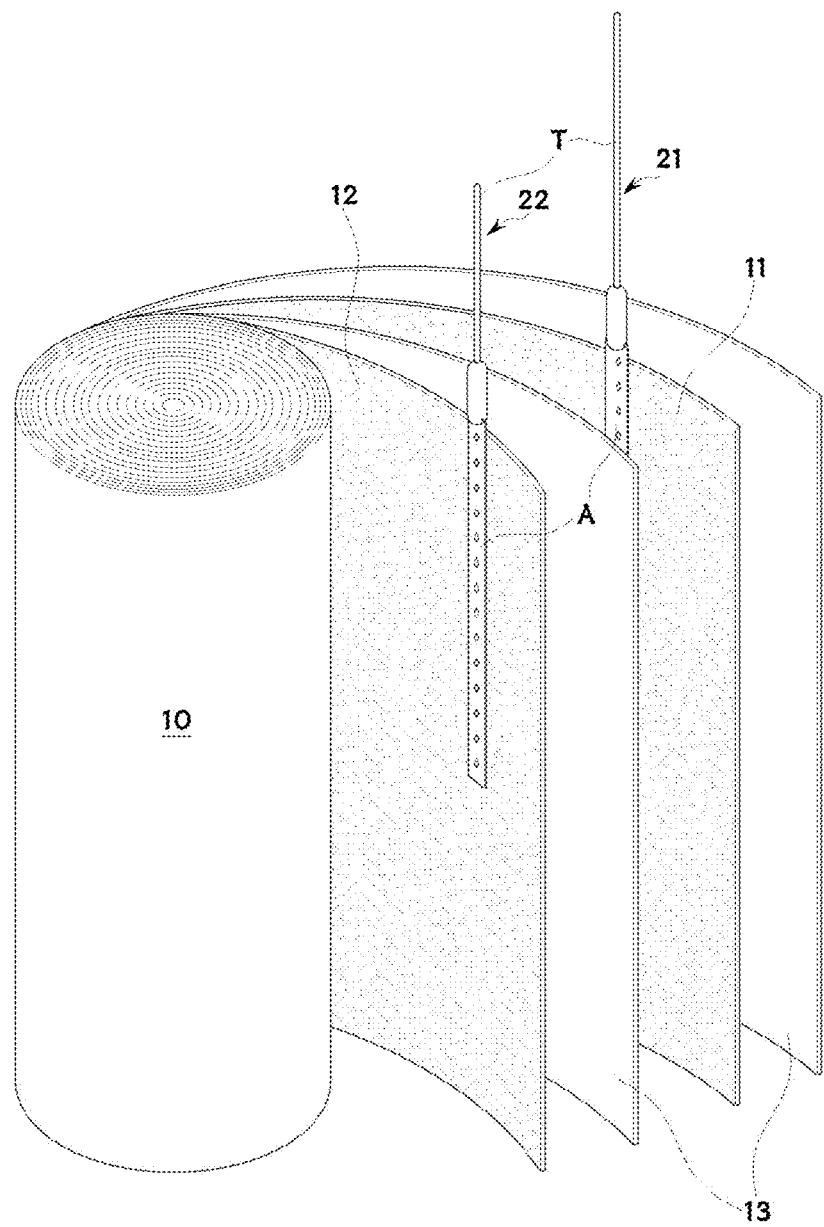
FIG. 8 is an exploded perspective view showing the electric double layer device according to the present invention.
Figure 9:
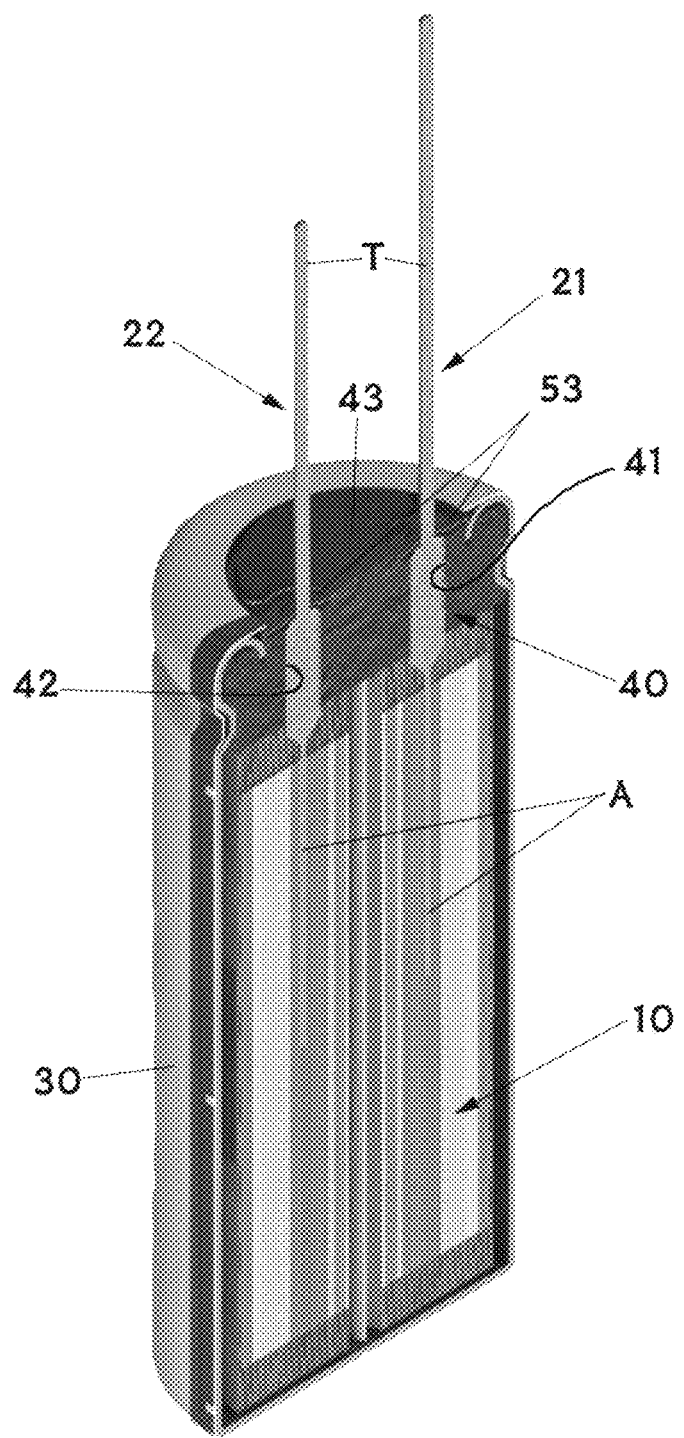
FIG. 9 is a longitudinal sectional view showing the electric double layer device according to the present invention.

FIG. 7 is a perspective view showing an electric double layer device according to the present invention, FIG. 8 is an exploded perspective view showing the electric double layer device according to the present invention, and FIG. 9 is a longitudinal sectional view showing the electric double layer device according to the present invention.

As shown in FIGS. 7 to 9, the electric double layer device according to the present invention includes a wound electrode unit 10 having a first current collection sheet 11 and a second current collection sheet 12 wound in the state in which the first current collection sheet 11 and the second current collection sheet 12 are separated from each other by a separating sheet 13, a first terminal 21 and a second terminal 22 connected to the first current collection sheet 11 and the second current collection sheet 12, respectively, a case 30 for receiving the wound electrode unit 10, and a rubber cap 40 for covering the case 30, the rubber cap 40 having therein a first through hole 41 and a second through hole 42, through which the first terminal 21 and the second terminal 22 extend respectively so as to be exposed to the outside.

Figure 10:
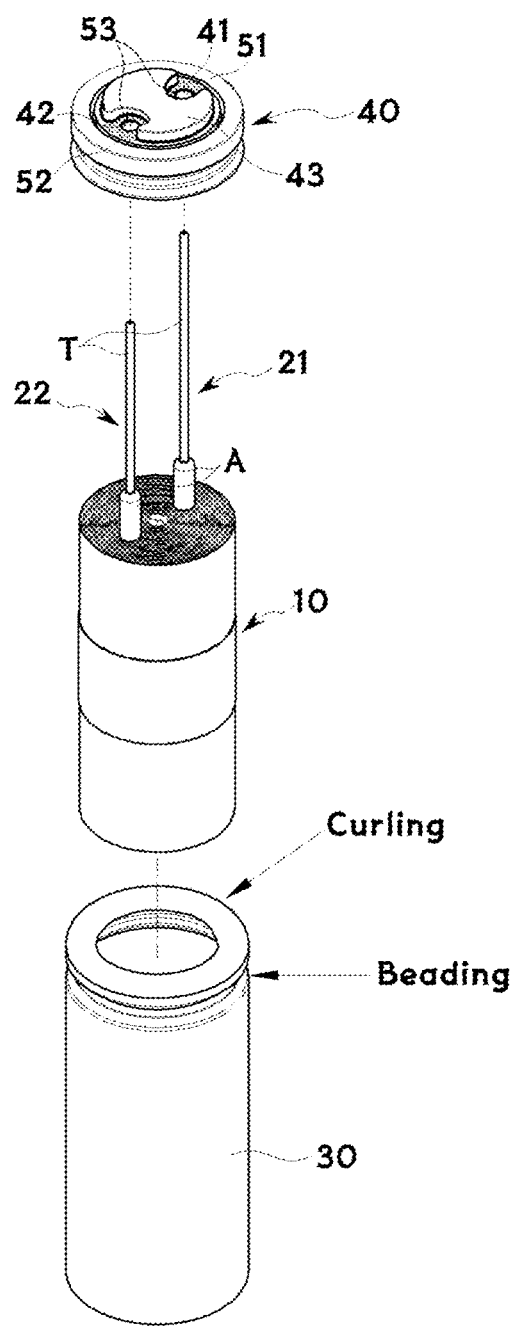
FIG. 10 is a view showing a wound electrode unit that is applied to the electric double layer device according to the present invention.
Figure 11:
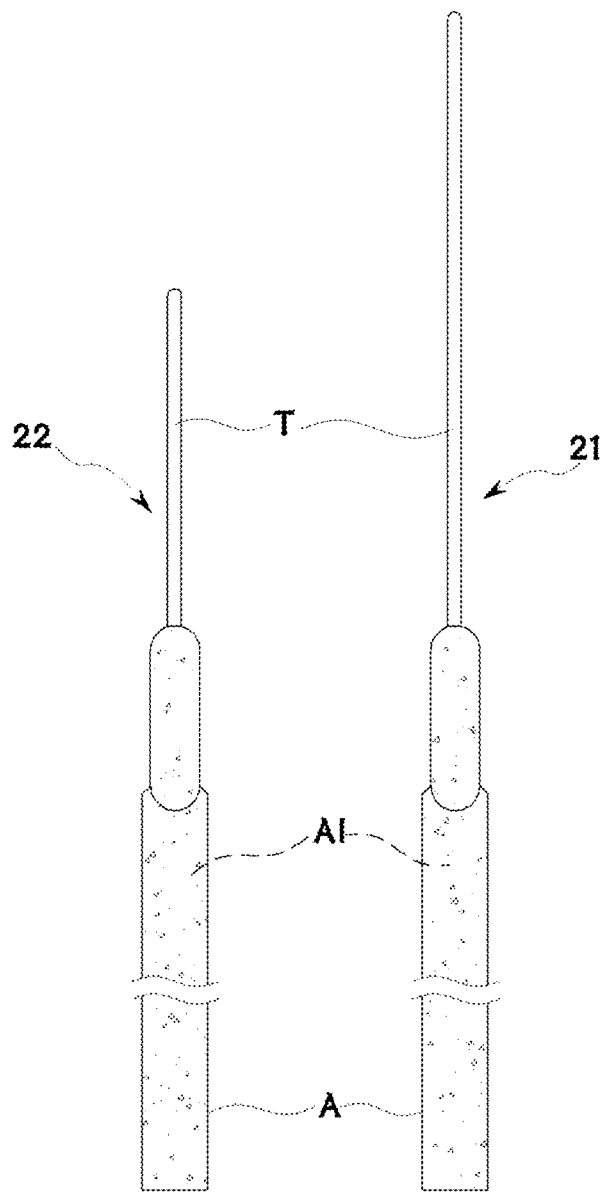
FIG. 11 is a perspective view showing a first terminal and a second terminal that are applied to the electric double layer device according to the present invention.

FIG. 10 is a view showing a wound electrode unit that is applied to the electric double layer device according to the present invention.

As shown in FIGS. 7 to 10, the first current collection sheet 11 and the second current collection sheet 12 may be used as a positive electrode current collector and a negative electrode current collector, each of which is made of aluminum foil on which an electrode active material is coated. The electrode active material may be conductive paste including mostly activated carbon. The wound electrode unit 10, which includes the first current collection sheet 11 and the second current collection sheet 12, is impregnated with an electrolyte, is placed in the case 30, and the upper end of the case 30, which faces the rubber cap 40, is beaded and curled, whereby coupling therebetween is completed.

The first terminal 21, which is connected to the first current collection sheet 11 used as the positive electrode current collector, functions as a positive electrode terminal, and the second terminal 22, which is connected to the second current collection sheet 12 used as the negative electrode current collector, functions as a negative electrode terminal.

An acceleration test was performed on the electric double layer device having the above structure under specific conditions of a relative humidity of 90%, a temperature of 60°

C., and a voltage of 2.7 V. As a result, positive ions were discharged through the gap defined between the second terminal 22, which functions as a negative electrode terminal, and the second through hole 42, and the discharged positive ions were wetted due to external humidity, whereby the lifespan of the electric double layer device was limited to about 1,000 hours.

The electric double layer device according to the present invention further includes a urethane potting unit 50 for filling the gap between the first terminal 22 and the first through hole 41 and the gap between the second terminal 22 and the second through hole 42 in order to completely prevent the leakage of positive ions, whereby the lifespan of the electric double layer device is further increased.

More specifically, the urethane potting unit 50 may include a first pot recess 51 and a second pot recess 52 defined by a volume protrusion 43, which protrudes upward, of the rubber cap 40 so as to be disposed around the first through hole 41 and the second through hole 42, through which the first terminal 22 and the second terminal 22 extend, respectively, such that the first pot recess 51 and the second pot recess 52 are lower in position than the volume protrusion 43 and a urethane resin 53 filling and hardened in the first pot recess 51 and the second pot recess 52.

Since the urethane resin 53 is rapidly and easily introduced into the first pot recess 51 and the second pot recess 52 defined by the volume protrusion 43, which protrudes upward, of the rubber cap 40 such that the first pot recess 51 and the second pot recess 52 are lower in position than the volume protrusion 43, a phenomenon in which the urethane resin 53 spreads out after being introduced into the first pot recess 51 and the second pot recess 52 is maximally prevented while improving workability, whereby the electric double layer device has a neat external appearance.

Figure 12A:
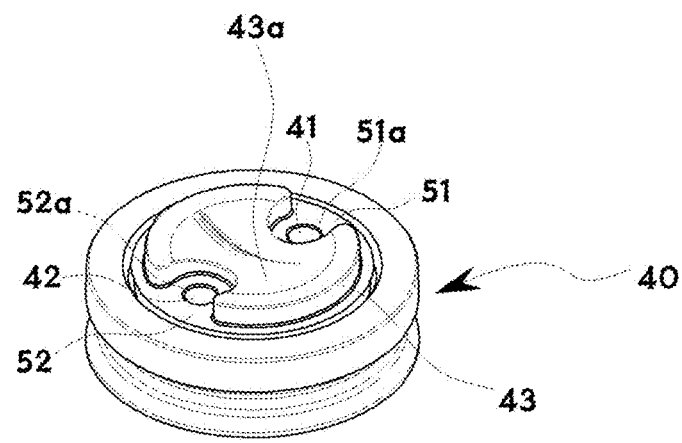
FIG. 12A is a perspective view showing a rubber cap that is applied to the electric double layer device according to the present invention.
Figure 12B:
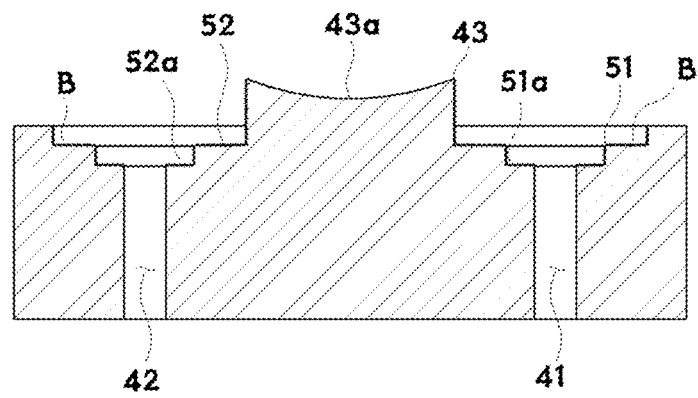
FIG. 12B is a sectional view showing the rubber cap that is applied to the electric double layer device according to the present invention.

FIG. 12A is a perspective view showing the rubber cap (after being beaded) that is applied to the electric double layer device according to the present invention, and FIG. 12B is a sectional view showing the rubber cap (before being beaded) that is applied to the electric double layer device according to the present invention.

As shown in FIGS. 12A and 12B, the first pot recess 51 has a first pocket 51a recessed along the inner diameter of the first through hole 41 such that the urethane resin 53 fills the first pocket 51a and is hardened in tight contact with the first terminal 21, and the second pot recess 52 has a second pocket 52a recessed along the inner diameter of the second through hole 42 such that the urethane resin 53 fills the second pocket 52a and is hardened in tight contact with the second terminal 22.

When the urethane resin 53 is introduced into the first pot recess 51 and the second pot recess 52, the urethane resin 53 rapidly fills the first pocket 51a and the second pocket 52a and is hardened in tight contact with the first terminal 21 and the second terminal 22, respectively. As a result, it is possible to further completely prevent the leakage of positive ions through the gap between the first terminal 22 and the first through hole 41 and the gap between the second terminal 22 and the second through hole 42, whereby the lifespan of the electric double layer device is further increased.

Meanwhile, in the electric double layer device according to the present invention, the volume protrusion 43, which protrudes upward, of the rubber cap 40 may have a concave portion 43a, the height of which gradually decreases toward the center thereof such that the concave portion 43a becomes flat when the case 30 is beaded.

When the case 30 is beaded for tight coupling between the case 30 and the rubber cap 40, the side surface of the rubber cap 40 decreases, whereas the center of the upper part of the volume protrusion 43, which is opposite the wound electrode unit 10, rises convexly. In this case, when the first terminal 21 and the second terminal 22 are connected to a circuit board, which is not shown, the first terminal 21 and the second terminal 22 may not be stably loaded on the circuit board by the convex portion of the volume protrusion 43.

In order to solve the above problem, the present invention is characterized in that the volume protrusion 43, which protrudes upward, of the rubber cap 40 has a concave portion 43a, the height of which gradually decreases toward the center thereof such that the concave portion 43a becomes flat even though the center of the volume protrusion 43 rises when the case 30 is beaded, whereby the first terminal 21 and the second terminal 22 are stably loaded on the circuit board when the first terminal 21 and the second terminal 22 are connected to the circuit board.

On the other hand, each of the first pot recess 51 and the second pot recess 52 may have an irregular portion B for increasing surface coupling force between each of the first pot recess 51 and the second pot recess 52 and the urethane resin 53. The irregular portion B may be formed by arc-discharging the surface of a mold at the time of molding the rubber cap 40 or by grinding the rubber cap 40 using a sand paper. Alternatively, the irregular portion B may be formed by mechanical etching, such as sand blasting, or by chemical etching.

In addition, a primer adhesive may be applied to the first pot recess 51 and the second pot recess 52, and then the urethane resin 53 may be introduced into the first pot recess 51 and the second pot recess 52 so as to fill the first pot recess 51 and the second pot recess 52, whereby adherence between the first pot recess 51 and the urethane resin 53 and between the second pot recess 52 and the urethane resin 53 may be maximally increased. The primer adhesive may be an ethyl acetate adhesive.

Furthermore, each of the first terminal 21 and the second terminal 22 may include an aluminum terminal A, connected to a corresponding one of the first current collection sheet 11 and the second current collection sheet 12 so as to be inserted into a corresponding one of the first through hole 41 and the second through hole 42, and an outer terminal T, welded to the aluminum terminal A so as to be exposed out of the rubber cap 40, the outer terminal T being a terminal formed by plating an iron terminal with copper and tin. In particular, the aluminum terminal A may be anodized such that an aluminum oxide film Al is formed on the aluminum terminal A.

The aluminum terminal A is easily oxidized and corroded. When the aluminum terminal A is oxidized, the lifespan of the electric double layer device is reduced. In addition, the leakage of positive ions is accelerated, with the result that the positive ions are wetted, whereby the corrosion of the aluminum terminal A is accelerated.

In order to solve the above problem, the electric double layer device according to the present invention is characterized in that the aluminum terminal A is anodized in advance to form an aluminum oxide film Al thereon. An acceleration test was performed on the electric double layer device having the first terminal 21 and the second terminal 22, each of which includes the aluminum terminal A having the aluminum oxide film Al formed thereon, under specific conditions of a relative humidity of 90%, a temperature of 60° C., and a voltage of 2.7 V. As a result, the lifespan of the electric double layer device was increased to about 1,500 hours. Furthermore, an acceleration test was performed on the electric double layer device according to the present invention further including the urethane potting unit 50 under the same conditions. As a result, the lifespan of the electric double layer device was increased to about 2,500 hours.

INDUSTRIAL APPLICABILITY

The present invention may be applied to the field of devices that store electrical energy, such as a battery, a capacitor, and an electrolytic condenser.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An electric double layer device comprising:
   an electrode unit;
   a first terminal and a second terminal outwardly extending from the electrode unit;
   a case accommodating the electrode unit; and
   a closure covering the case and having first and second through holes through which the first and second terminals respectively pass to be exposed to the environment, the closure comprising:
      a lower surface and an upper surface opposing each other, wherein the lower surface faces the electrode unit;
      a first pocket disposed along the upper surface and surrounding the first through hole;
      a second pocket disposed along the upper surface and surrounding the second through hole; and
      a urethane resin filling in the first pocket and the second pocket,
   wherein the electric double layer device further comprises a volume protrusion protruding upwardly from the upper surface of the closure and at least partially surrounding the first and second pockets, wherein the first and second pockets are lower in position than the volume protrusion, and wherein the volume protrusion has a concave portion on a top surface thereof, a height of which gradually decreases toward a center thereof, the concave portion being configured to become flat when the case is beaded.

2. The electric double layer device according to claim 1, wherein:
   the first pocket is recessed along a radial direction of an inner diameter of the first through hole such that the urethane resin fills the first pocket and is hardened in tight contact with the first terminal, and
   the second pocket is recessed along a radial direction of an inner diameter of the second through hole such that the urethane resin fills the second pocket and is hardened in tight contact with the second terminal.

3. The electric double layer device according to claim 1 or claim 2, further comprising: a primer adhesive formed between the urethane resin and the first and second pockets.

4. The electric double layer device according to claim 3, wherein the primer adhesive is an ethyl acetate adhesive.

5. The electric double layer device according to claim 1 or claim 2, wherein the electrode unit comprises first and second current collection sheets respectively connected to the first and second terminals, wherein each of the first terminal and the second terminal comprises: an aluminum terminal connected to a corresponding one of the first current collection sheet and the second current collection sheet so as to be inserted into a corresponding one of the first through hole and the second through hole; and an outer terminal welded to the aluminum terminal so as to be exposed out of the closure.

6. The electric double layer device according to claim 5, further comprising an aluminum oxide film formed on the aluminum terminal.

7. The electric double layer device according to claim 1, wherein the electric double layer device is an electric double layer capacitor device.

8. The electric double layer device according to claim 1, wherein the first and second through holes are respectively aligned with the first and second pockets in a direction extending from the upper surface to the lower surface of the closure.

9. The electric double layer device according to claim 1, wherein the closure is a rubber cap.

10. The electric double layer device according to claim 9, wherein the rubber cap has a concave portion.

11. The electric double layer device according to claim 1, wherein the first terminal and/or the second terminal comprise an aluminum oxide film.

12. The electric double layer device according to 11, wherein the aluminum oxide film contacts the first or second through hole.

13. The electric double layer device according to claim 1, wherein the electric double layer device comprises a battery.

14. The electric double layer device according to claim 13, wherein the battery comprises a liquid electrolyte battery or a polymer electrolyte battery.

15. The electric double layer device according to claim 14, wherein the liquid electrolyte battery comprises a lithium ion battery.

16. The electric double layer device according to claim 14, wherein the polymer electrolyte battery comprises a lithium polymer battery.

17. An electric double layer device comprising:
   an electrode unit;
   a first terminal and a second terminal outwardly extending from the electrode unit;
   a case accommodating the electrode unit; and
   a closure covering the case and having first and second through holes through which the first and second terminals respectively pass to be exposed to the environment, the closure comprising:
      a lower surface and an upper surface opposing each other, wherein the lower surface faces the electrode unit;
      a first pocket disposed along the upper surface and surrounding the first through hole;
      a second pocket disposed along the upper surface and surrounding the second through hole; and
      a urethane resin filling in the first pocket and the second pocket,
   wherein the electric double layer device further comprises first and second pot recesses higher in position than and respectively surrounding the first and second pockets, and wherein each of the first pot recess and the second pot recess has an irregular portion configured to increase surface coupling force between each of the first pot recess and the second pot recess and the urethane resin.

18. An electric double layer device comprising:
an electrode unit;
a first terminal and a second terminal outwardly extending from the electrode unit;
a case accommodating the electrode unit; and
a closure covering the case and having first and second through holes through which the first and second terminals respectively pass to be exposed to the environment, the closure comprising:
- a lower surface and an upper surface opposing each other, wherein the lower surface faces the electrode unit;
- a first pocket disposed along the upper surface and surrounding the first through hole;
- a second pocket disposed along the upper surface and surrounding the second through hole; and
- a urethane resin filling in the first pocket and the second pocket, wherein the first terminal and/or the second terminal comprise an aluminum oxide film, wherein the aluminum oxide film contacts the first or second through hole, wherein the first terminal and/or the second terminal includes portions exposed to the environment, and wherein the exposed portions are not anodized with the aluminum oxide film.

* * * * *

UNITED STATES PATENT AND TRADEMARK OFFICE
CERTIFICATE OF CORRECTION

PATENT NO. : 10,658,128 B2
APPLICATION NO. : 15/564189
DATED : May 19, 2020
INVENTOR(S) : Na Ri Shin et al.

Page 1 of 1

It is certified that error appears in the above-identified patent and that said Letters Patent is hereby corrected as shown below:

In the Claims

Column 12, Line 27, Claim 12, delete "to" and insert -- to claim --.

Signed and Sealed this
Sixth Day of October, 2020

Andrei Iancu
*Director of the United States Patent and Trademark Office*